Aug. 6, 1929. T. STEIN 1,723,089
POWER PLANT
Filed Oct. 28, 1924
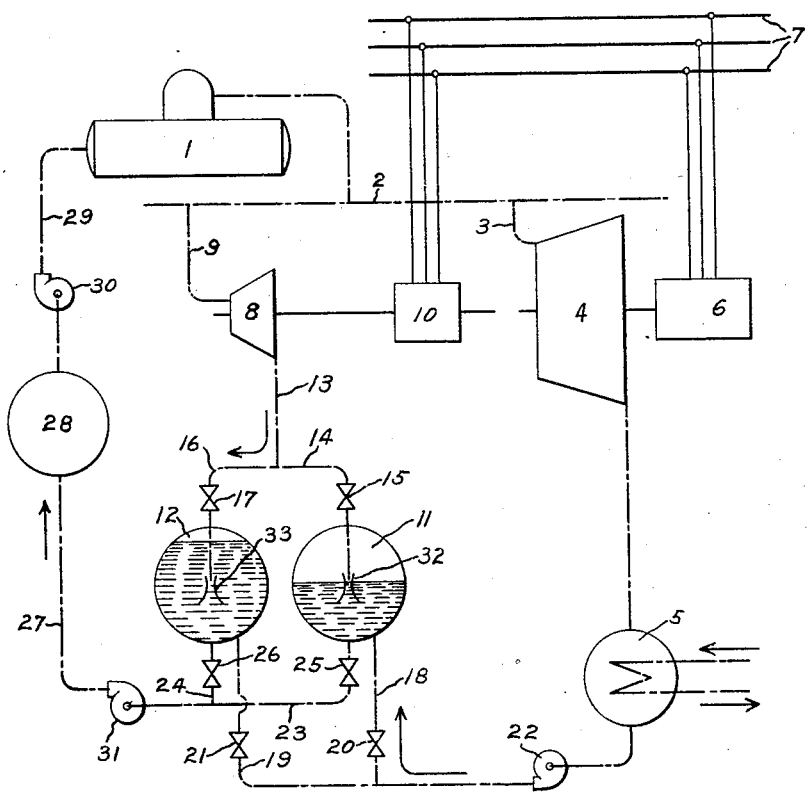
Inventor:
Theodor Stein,
by [signature]
His Attorney.

Patented Aug. 6, 1929.

1,723,089

UNITED STATES PATENT OFFICE.

THEODOR STEIN, OF FRIEDENAU, GERMANY, ASSIGNOR TO GENERAL ELECTRIC COMPANY, A CORPORATION OF NEW YORK.

POWER PLANT.

Application filed October 28, 1924, Serial No. 746,391, and in Germany November 6, 1923.

The present invention relates to power plants and especially to an improved method of and arrangement for heating water such as feed water by means of steam taken from an engine of the plant.

The object of the invention is to provide an improved heating method and an improved heating system for carrying out such method wherein the heating is effected with the best possible economy, and for a consideration of what I believe to be novel and my invention, attention is directed to the accompanying description and the claims appended thereto.

In the drawing, the figure is a diagrammatic view of a power plant embodying my invention.

Referring to the drawing, 1 indicates a steam boiler which supplies steam to a steam line 2, from which it is fed through a conduit 3 to a main turbine 4. Turbine 4 exhausts to a condenser 5 of any suitable construction. It drives a generator 6 connected to bus bars 7, or other suitable load.

According to the embodiment of my invention, illustrated in the drawing, I provide a back-pressure turbine 8 which receives steam from line 2 through a conduit 9 and drives a load which it is permissible to let vary over a considerable range. For example, as in the present instance, it may drive the generator 10 connected to bus bars 7 in parallel with generator 6. I then provide a plurality of water storage tanks 11 and 12, tank 11 being connected to the exhaust conduit 13 of turbine 8 by a conduit 14 containing a valve 15, and tank 12 being connected thereto by a conduit 16 containing a valve 17. Tanks 11 and 12 are connected to condenser 5 by conduits 18 and 19 provided with shut-off valves 20 and 21 so that the condensate from condenser 5 can be fed to either tank. 22 indicates a suitable condensate pump. Connected to tanks 11 and 12 are conduits 23 and 24 containing valves 25 and 26. Conduits 23 and 24 connect with a conduit 27 which is connected to a hot water storage reservoir 28. Reservoir 28 is connected to boiler 1 by a conduit 29 in which is a suitable boiler feed pump 30. In conduit 27 is a suitable pump 31. Conduits 14 and 16 preferably project well down into tanks 11 and 12, terminating in discharge nozzles 32 and 33.

According to my improved method of heating the feed water, I first store a quantity of water from condenser 5 in one of the tanks 11 or 12 and I then heat such water in its totality by steam taken from back pressure turbine 8. By this means, it will be seen, the turbine works with a constantly increasing counterpressure or back pressure and hence with a steadily decreasing drop in heat. The steady increase of the counterpressure is automatically produced by the gradual increase of the condensation temperature of the steam, which condensation temperature increases gradually as steam is supplied to the water, due to the gradual heating of the water. The temperature of the heating steam thus more nearly coincides at all times with that of the feed water being heated, that is, the feed water is heated without waste of heat energy. Thus by this means there is actually realized the so-called regenerative process of heating which process closely approximates the Carnot cycle process that is, a thermodynamically reversible process in which as applied to the heating of feed water by steam, any external application of heat to the feed water will cause the condensed heating steam to re-evaporate, and becomes equivalent in result, to gradually heating feed water by means of steam drawn from an infinite number of taps or stages in a steam turbine. This ideal method of heating feed water has been approximated heretofore by tapping a steam turbine and heating the feed water in a few stages by the tapped steam. This, however, does not provide the gradual, continuous heating obtained by the means of the present invention, since the heating stages are relatively few in number for practical reasons.

In the arrangement shown in the drawing, it may be assumed that tank 12 has been filled with condensate from condenser 5 and such condensate is now going through the process of being heated by steam from turbine 8, valve 17 being open and valves 26 and 21 being closed. At the same time tank 11 is being filled with condensate from condenser 5, valve 20 being open and valves 15 and 25 being closed. Boiler 1 is, in the meantime, being supplied with feed water from hot water storage tank 28. Now, when the process is completed, the water in tank 12 being heated to the desired temperature, valve 17 may be closed and valve 15 opened so as to direct the heating steam to tank 11 which in the meantime has become filled with water. The hot water in tank 12 is now drawn off to storage tank 28, a thing which may be quickly accomplished, after which valve 21 is opened and valve 20 is closed so that tank 12 will be again filled. This cycle of storing, heating and drawing off the water may be made to occupy a suitable amount of time, for example, one hour, and by means of the two tanks 11 and 12 may be continuous. In connection with the foregoing description of the operation, it will be understood that the essential thing is that while the one tank, filled with water, is being heated, the other tank is being filled and it will be understood that the change in the connections at the end of any cycle may be carried out in any desired sequence.

By the invention, the heating is carried out with the highest possible efficiency since the condensation temperature varies directly with the water temperature and differs therefrom only by the unavoidable temperature drop necessary for the heat transition.

What I claim as new and desire to secure by Letters Patent of the United States, is:—

1. In a power plant, the combination of a main turbine and a condenser therefor, a back pressure turbine and means for successively heating in totality alternate collections of condensate from the condenser, by the exhaust of said back pressure turbine, said heating taking place at continuously increasing temperature.

2. In a power plant, the combination of a main turbine and a condenser therefor, a back pressure turbine, a plurality of water storage tanks, means for intermittently collecting the condensate from said condenser in the several storage tanks, and means for successively heating in totality the collections of condensate in said storage tanks by the exhaust of said back pressure turbine, said heating taking place at continuously increasing temperature.

3. In a power plant, the combination of a main turbine and a condenser therefor, a back presssure turbine, a plurality of water storage tanks, conduits connecting the condenser to said tanks, pump means for pumping the condensate from the condenser through said conduits to either of said tanks, conduits connecting the exhaust of said back pressure turbine to said tanks, and valve means in said conduits whereby a tank filled with condensate may be connected to the exhaust of said back pressure turbine to be heated at continuously increasing temperature, while another tank is being filled with condensate from the condenser.

In witness whereof, I have hereunto set my hand this 10th day of October, 1924.

THEODOR STEIN.